Figure 1:
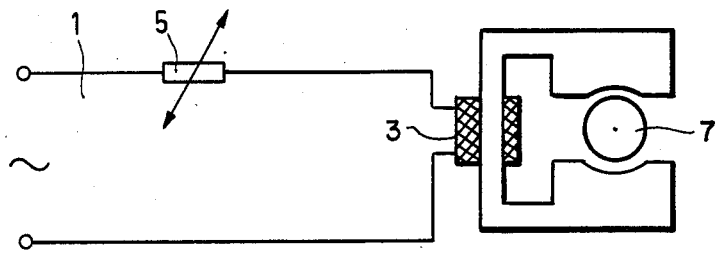

United States Patent [19]

Schemmann et al.

[11] Patent Number: 4,500,825
[45] Date of Patent: Feb. 19, 1985

[54] SELF-STARTING SINGLE-PHASE SYNCHRONOUS MOTOR

[75] Inventors: Hugo Schemmann, Schaesberg, Netherlands; Leo Bertram, Stolberg, Fed. Rep. of Germany

[73] Assignee: U.S. Philips Corporation, New York, N.Y.

[21] Appl. No.: 408,583

[22] Filed: Aug. 17, 1982

[30] Foreign Application Priority Data

Jan. 29, 1982 [DE] Fed. Rep. of Germany ....... 3202965

[51] Int. Cl.³ .............................................. H02P 1/42
[52] U.S. Cl. .................................. 318/792; 318/783; 318/400
[58] Field of Search ............... 318/781, 783, 784, 792, 318/791, 385, 391, 392, 399, 400, 403, 471, 393, 394; 361/24, 25, 29

[56] References Cited

U.S. PATENT DOCUMENTS

| 3,965,392 | 6/1976 | Moorhead | 318/783 X |
| 4,198,669 | 4/1980 | Kulwicki | 318/784 X |
| 4,306,264 | 12/1981 | Alessio | 318/783 X |
| 4,387,412 | 6/1983 | Woods | 318/783 X |
| 4,408,244 | 10/1983 | Weible | 318/784 X |

FOREIGN PATENT DOCUMENTS 44244 1/1982 European Pat. Off. ............ 318/781

*Primary Examiner*—J. V. Truhe
*Assistant Examiner*—Patrick C. Keane
*Attorney, Agent, or Firm*—Robert T. Mayer; Bernard Franzblau

[57] ABSTRACT

A self-starting single-phase synchronous motor without an auxiliary coil comprises a diametrically magnetized permanent-magnet rotor and a two-pole stator provided with exciter coils. A PTC resistor (5) is arranged in the circuit (1) of the exciter coils. The PTC resistor is proportioned so that its resistance will increase to a continuously permissible load resistance value after approximately 0.5 to 1 sec.

10 Claims, 3 Drawing Figures

SELF-STARTING SINGLE-PHASE SYNCHRONOUS MOTOR

The invention relates to a self-starting single phase synchronous motor without an auxiliary coil, which motor comprises a diametrically magnetized permanent-magnet rotor and a two-pole stator provided with exciter coils. This general type of motor is described in greater detail in U.S. Pat. No. 3,675,059.

From DE-AS No. 25 24 519 it is known that single-phase synchronous motors of this type can start only when the acceleration is such that it is capable of bringing the rotor at the synchronous angular velocity within a fraction of the period of the energizing voltage. The no-load acceleration depends on the current torque and the mass moment of inertia. At higher operating frequencies the time available for acceleration decreases, which means that the accelerating force should increase. However, since the inductive reactance increases with the frequency the critical acceleration decreases as a result of the decreasing current. Within specific limits this may be compensated for by a reduction of the impedance Z by modifying the coil winding-arrangement. However, this will soon cause to the thermal limits of the motor to be exceeded, so that generally the permissible mass moment of inertia should be reduced when the operating frequency is increased. This means that for a motor of specific dimensions the acceleration torque required for driving the appliance is no longer available.

However, it is also possible that a motor for a specific use when thermally loaded up to the full thermal limit is not capable of producing the required mass moment of inertia during starting.

Further, in the case of starting under loaded conditions the residual accelerating torque required for starting may become too small as a result of braking frictional torques or other opposing torques, for example elastic counter-torques.

It is an object of the invention to operate a single-phase synchronous motor in such a way that it is capable of producing the accelerating torque required for starting without being overheated.

This object may be achieved in various ways. A solution in accordance with the invention is that in the circuit of the exciter coils a positive-temperature-coefficient (PTC) resistor is arranged, which resistor is proportioned so that its resistance will increase to a continuously permissible load resistance after approximately 0.5 to 1 sec.

By including a PTC resistor the operating current in the starting phase is briefly raised to such a value that the accelerating torque required for starting the motor is reached. After the starting phase the current is limited in such a way that it no longer exceeds the value corresponding to the maximum permissible thermal load during normal operation. It may be assumed that the starting phase is completed after approximately 0.5 to 1 sec.

Another solution is to arrange a positive temperature coefficient (PTC) resistor is arranged parallel to a load resistor arranged in series with the exciter coil, which PTC resistor is proportioned so that after approximately 0.5 to 1 sec. its resistance, starting from a very low value, will increase to a value for which the branch in which this resistor is arranged is cut off. In this case the operating current in the starting phase is also increased to a level such that the motor experiences the torque required for accelerating. At the end of the starting phase the current is then limited to a level such that the value corresponding to the maximum thermal load during normal operation is not exceeded.

A further solution in accordance with the invention is that a timing element is arranged parallel to a load resistor arranged in series with the exciter coil, which element is proportioned so that it opens the bypass branch in which it is arranged approximately 0.5 to 1 sec after switching on. The timing element may be an electronic or mechanical switch which opens after a time delay towards the end of the starting phase. In this case the timing element takes over the starting current during the starting period. After termination of the starting period the timing element opens the bypass circuit and the exciter coil is now arranged in series with the series resistor which is dimensioned for the maximum thermal load.

It is known per se, to switch starting coils in and out by means of temperature-dependent resistors. In DE-AS No. 10 02 871 such an auxiliary coil is switched on during starting and switched off after starting by means of such a resistor. Further, it is known from DE-AS No. 19 15 135 to short-circuit a starting coil after the starting period via a temperature-dependent resistor. However, in these known cases the operating coil is not influenced directly.

Figure 2:
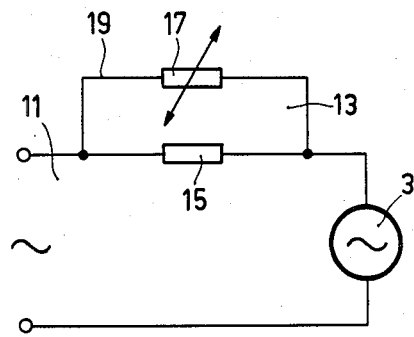
Figure 3:
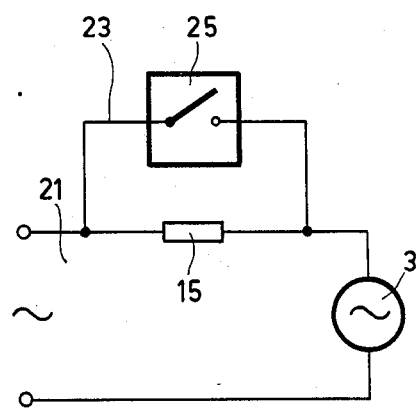

Some embodiments of the invention will now be described in more detail, by way of example, with reference to the drawings. In the drawings:

FIG. 1 shows a self-starting single-phase synchronous motor with a series connected PTC resistor, FIG. 2 shows a synchronous motor preceded by a parallel arrangement of a load resistor and a PTC resistor, FIG. 3 shows a self-starting synchronous motor with a series resistor and a timing element, in the form of an electronic or mechanical switch which opens after a time delay, arranged in parallel with said series resistor, and FIG. 1 shows a circuit diagram in which a single-phase synchronous motor with a permanent magnet rotor 7 is arranged in the circuit 1. The circuit comprises a resistor 5 having a positive temperature coefficient. This PTC resistor 5 is dimensioned in such a way that in the starting phase it feeds a current through the synchronous motor stator exciter coil 3 which is larger than the maximum permissible current during normal operation at the maximum permissible thermal load. Within approximately 0.5 to 1 sec., the resistance of the PTC resistor 5 increases to such an extent that the current through the coils of the synchronous motor 3 is limited to a value corresponding to the permissible thermal load of the motor. This value corresponds to the continuously permissible load resistance.

FIG. 2 shows a circuit arrangement in which the branch 11 comprises the synchronous motor 3 and a parallel arrangement 13 comprising a series resistor 15 and a PTC resistor 17. The series resistor 15 is proportioned so that during normal operation the coils of the synchronous motor 3 carry a current which at the most corresponds to the maximum thermal load. The PTC resistor 17 is dimensioned so that after approximately 0.5 to 1 sec, starting from a very low value, its resistance increases to a value at which the branch 19 which contains this PTC resistor 17 is cut off. After the starting period only the series resistor 15 is then operative.

In the embodiment shown in FIG. 3 the circuit 21 again comprises the synchronous motor 3 and the series resistor 15. The series resistor 15 is bypassed by a bypass circuit 23 which includes a timing element in the form of an electronic or mechanical switch which opens after a time delay. The timing element 25 is designed so that it opens the branch 23 in which it is arranged approximately 0.5 to 1 sec after switching power is switched on. As a result of this only the series resistor 15 is operative after the starting period.

Preferably all resistors, the PTC and series resistors, are physically separated from the motor coil and, if possible, they are cooled separately.

What is claimed is:

1. A single-phase synchronous motor of the type that is self-starting without a start winding and which comprises: a diametrically magnetized permanent magnet rotor and a two-pole stator provided with exciter coils, a pair of input terminals for connection to a source of AC supply voltage, a positive temperature coefficient (PTC) resistor, means connecting the PTC resistor and the motor exciter coils in series circuit across the input terminals, and wherein the PTC resistor is proportioned so that at start-up of the motor the PTC resistor has a relatively low resistance value such that a start-up current is applied to the exciter coils of a value larger than the permissible current flow during normal motor operation and sufficient to accelerate the motor to its normal running speed within approximately 0.5 to 1 second after said AC voltage is applied to the input terminals and the resistance of the PTC resistor will increase to a continuously permissible load resistance value within said approximately 0.5 to 1 sec.

2. A self-starting single-phase synchronous motor without an auxiliary coil comprising, a diametrically magnetized permanent-magnet rotor and a two-pole stator provided with an exciter coil, a positive temperature coefficient (PTC) resistor connected in parallel to a load resistor, means connecting the parallel combination of PTC resistor and load resistor in series with the exciter coil to a source of AC supply voltage, said PTC-resistor being proportioned so that after approximately 0.5 to 1 sec its resistance, starting from a very small value, will increase to a value such that the branch which includes said PTC resistor will effectively be cut off.

3. A self-starting single-phase synchronous motor without an auxiliary coil comprising: a diametrically magnetized permanent-magnet rotor and a two-pole stator provided with an exciter coil, a timing element arranged parallel to a load resistor and connected in series with the exciter coil across a source of AC supply voltge, and wherein the timing element is dimensioned so that it opens a bypass branch in which it is arranged approximately 0.5 to 1 sec after switching on the AC supply voltage.

4. A motor as claimed in claim 2 wherein said load resistor has a resistance value equal to a continuously permissible motor load resistance such as to limit the current to a value corresponding to the maximum permissible thermal load of the motor.

5. A self-starting single-phase synchronous motor as claimed in any one of the claims 1 to 3, characterized in that the resistors are physically isolated from the exciter coils of the motor.

6. A single-phase synchronous motor that will self-start without a start winding comprising, a two-pole stator provided with at least one main stator winding, a diametrically magnetized permanent-magnet rotor, a pair of input terminals for connection to a source of AC supply voltage, a positive temperature coefficient (PTC) resistor, means connecting the PTC resistor and the main stator winding in series across the input terminals, said PTC resistor being proportioned so that it will respond to a start-up current for the main stator winding whereby its resistance will increase from a relatively low value at start-up to a continuously permissible load resistance value within a time period approximately equal to the time period required to accelerate the motor from a standstill position to normal operation of the motor.

7. A motor as claimed in claim 6 wherein said time period is approximately 0.5 to 1 second and the PTC resistor self-heats to increase its resistance value to said continuously permissible load resistance value prior to any current overload condition in the motor and independent of the value of the motor overload current.

8. A motor as claimed in claim 6 wherein said PTC resistor is proportioned so that a start-up current will flow in the main stator winding in excess of the permissible value of current during normal operation and for a time period determined solely by the time period required to accelerate the motor from a standstill position to the synchronous speed of the motor.

9. In a single-phase synchronous motor of the type that is self-starting solely by the interaction of the rotor magnetic field with the magnetic field of the stator exciter winding and the arrangement of the stator magnetic core, the improvement comprising: a two-pole stator provided with at least one stator exciter winding, a permanent-magnet rotor, a pair of input terminals for connection to a source of AC supply voltage, a positive temperature coefficient (PTC) resistor, means connecting the PTC resistor and the stator exciter winding in series across the input terminals, said PTC resistor being arranged to self-heat and being proportioned so that at start-up it has a low resistance value whereby a start-up current in excess of normal motor running current will flow for a time period determined by the time period required to accelerate the motor from a standstill position to the normal synchronous speed of the motor thereby to heat the PTC resistor so that its resistance increases to a continuously permissible load resistance value which allows the motor to run at its normal synchronous speed, and wherein said time period is approximately 0.5 to 1 second.

10. A motor as claimed in claim 9 wherein the resistance of the PTC resistor increases to a continuously permissible load resistance value which limits the current in the stator exciter winding to a value corresponding to the maximum permissible thermal load of the motor.

* * * * *